United States Patent [19]

Conway

[11] Patent Number: 4,800,715
[45] Date of Patent: Jan. 31, 1989

[54] APPARATUS FOR SUPPRESSING INFRARED RADIATION EMITTED FROM GAS TURBINE ENGINES

[75] Inventor: Wallace R. Conway, Yorktown, Va.

[73] Assignee: The United States of America as represented by the Secretary of the Army, Washington, D.C.

[21] Appl. No.: 291,602

[22] Filed: Aug. 10, 1981

[51] Int. Cl.⁴ .............................................. F02K 1/38
[52] U.S. Cl. ...................................... 60/39.5; 60/264
[58] Field of Search ............... 60/39.5, 271, 264, 266; 239/265.17, 127.3, 265.13

[56] References Cited

U.S. PATENT DOCUMENTS

| | | | |
|---|---|---|---|
| 4,004,416 | 1/1977 | Amello et al. | 60/39.5 |
| 4,007,587 | 2/1977 | Banthin et al. | 60/271 |
| 4,215,537 | 8/1980 | Hurley | 60/39.5 |
| 4,295,332 | 10/1981 | Steyer et al. | 60/264 |
| 4,312,480 | 1/1982 | Miller | 60/264 |

Primary Examiner—Louis J. Casaregola
Attorney, Agent, or Firm—Norman L. Wilson, Jr.

[57] ABSTRACT

Successful flight of high altitude military aircraft is dependent, in part, upon the ability of the aircraft to remain undetected during flight. Against the highly sophisticated infrared sensors developed during recent years, particularly for miliary use, an aircraft powered by a gas turbine engine is at a particular disadvantage. Hence infrared emissions from gas turbine engines have been reduced by use of a variety of infrared radiation (IR) suppressor designs. But in these designs aerodynamic problems are difficult to analyze and geometrical parameters are very critical, and nearly impossible to maintain. The IR suppressor herein provides the best blend of simple aerodynamics, heat transfer, and geometry.

1 Claim, 2 Drawing Sheets

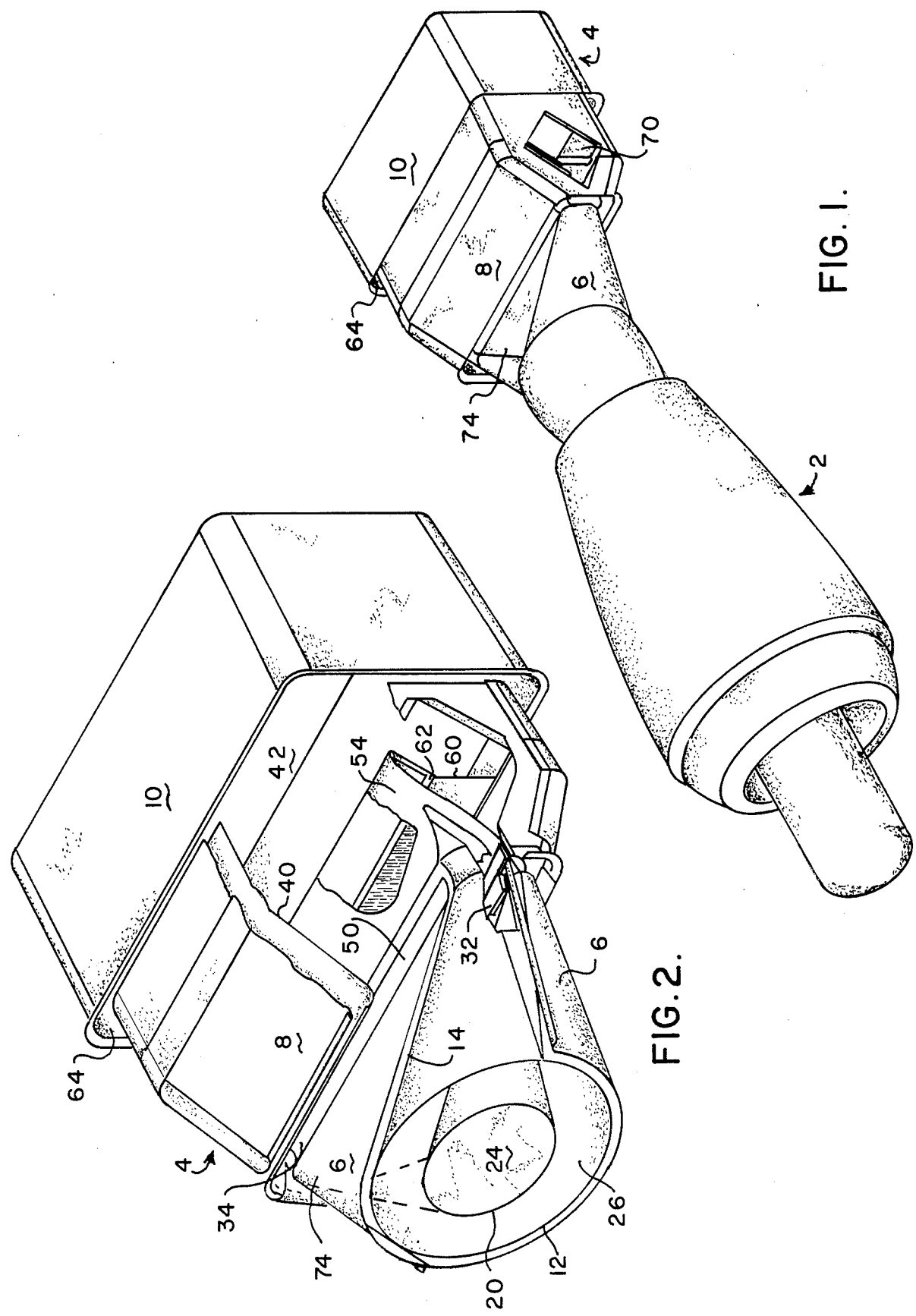

APPARATUS FOR SUPPRESSING INFRARED RADIATION EMITTED FROM GAS TURBINE ENGINES

BACKGROUND OF THE INVENTION

This invention relates to an apparatus for suppressing and masking infrared emissions from engine exhaust ducts.

The successful flight of high altitude military aircraft is dependent, in part, upon the ability of the aircraft to remain undetected during flight. Unfortunately, the gas stream discharged from the gas turbine engine is a high temperature gas mixture. Because of the high temperatures of the exhaust gases, and the hot metal walls directly in contact with the hot gases, turbine engines emit high levels of infrared energy. Hence, against the highly sophisticated infrared sensors developed during recent years, particularly for military use, an aircraft powered by a gas turbine engine is at a particular disadvantage.

Infrared emissions from gas turbine engines have been reduced by use of a variety of infrared radiation (IR) suppressor designs. Each type of design endeavors to provide a combination of aerodynamics, heat transfer, and geometry which will result in an effective IR suppressor for the least suppressor weight and horsepower effects on a turbine engine. Unfortunately existing suppressors have utilized geometries which have resulted in inherent aerodynamic and heat transfer problems. These geometries have required complex suppressor designs with highly undesirable effects on the engine horsepower.

One of these types of geometries utilizes a concentric center body within an annular duct. This suppressor geometry is referred to as a plug or center body suppressor and exemplified by U.S. Pat. Nos. 4,214,441, 4,044,555, 3,970,252 and the like. The plug suppressors are difficult to analyze aerodynamically and require aerodynamically shaped struts to position and support the center body. These struts exhibit larger temperature gradients and develop high thermal stresses at strut attachment points, presenting severe structural problems. The plug suppressor is difficult to fabricate and results in a heavy suppressor.

Another suppressor geometry being used is the dogleg or bend-duct type exemplified by U.S. Pat. Nos. 4,002,024, 3,921,906, 4,018,046 and others. The bend-duct suppressor presents inherent aerodynamic and heat transfer problems. The wall at the bend results in either an overly long suppressor or a complicated multi-bend-duct suppressor.

A third geometry type is the radial or horizontal wavy vane exemplified by U.S. Pat. Nos. 4,095,417, 4,007,587, and 4,215,537. The geometry involved is difficult to analyze, design, and fabricate and results in large reductions in engine horsepower and difficult heat transfer problems.

A study of prior art IR suppressors leads to the conclusion that infrared radiation suppression equipment for exhaust gas systems of aircraft require a blend of aerodynamics, heat transfer, and geometry in order to be highly effective in providing the desired infrared suppression levels for the least suppression system weight and engine horsepower. The correct blend of these three technologies has been difficult to achieve. The concentric plug, the bent or curved duct, and the wavy vane geometrics have inherent aerodynamic and heat transfer shortcomings which require complicated and heavy design concepts. Moreover, they require, a significant percentage of engine shaft horsepower. These designs, except for the wavy vane design also require that cooling air be supplied by either engine bleed air operated ejectors, auxiliary blowers, forward flight ram air, or main rotor downwash.

It can be seen that there is still room for improvement in the field of infrared suppressors for turbine engine exhaust ducts. Existing designs show that aerodynamic problems are difficult to analyze and that geometrical parameters are very critical, and nearly impossible to maintain. The invention herein provides the best blend of simple aerodynamics, heat transfer, and geometry. The design utilizes the simplest geometry arrangements to date.

SUMMARY OF THE INVENTION

Reduction in IR energy is achieved herein by an exhaust system design that prevents the direct viewing of the hot power turbine section, presents only visible surfaces that are cooled, and dilutes the exhaust gases with ambient air to achieve a lower gas temperature at the exit of the system. This is accomplished with minimum reduction in engine output shaft horsepower, with a minimum weight increase over a simple standard exhaust system, and by simple fabrication using readily available materials and minimum tooling.

The infrared emission suppressor provided herein includes a duct structure forming a transition section and a mixer section. The sections are configured to form juxtaposed converging and diverging exhaust ducts and means are provided for shielding these exhaust ducts from view from the rear. An extension section is also included for blocking the exhaust ducts from peripheral view. Film cooling means create a flow of air to cool the various sections.

DETAILED DESCRIPTION

The infrared suppressor contemplated herein achieves a line-of-sight blockage similar to the concentric plug suppressor designs but thru simply designed and fabricated chutes. By the use of chutes the suppressors herein eliminate the thermal stress and other structural design problems associated with the concentric plug type. The simple chute line-of-sight blockage feature of this invention also allows a more light weight and compact suppressor than the annular to rectangular suppressor designs described in U.S. Pat. Nos. 4,002,024, 4,007,587 and 4,018,046.

The IR suppressor of the invention, containing the chutes, the view blocking thereof, and the cooling means therefor, are fabricated in three segments, a transition section, a mixer section and an extension section. This will best be understood by reference to the accompanying drawing.

In the drawing FIG. 1 is a perspective view illustrating a turbine engine and showing the IR suppressor of the invention attached thereto.

FIG. 2 is a partially cutaway perspective view of the IR suppressor.

Figure 3:
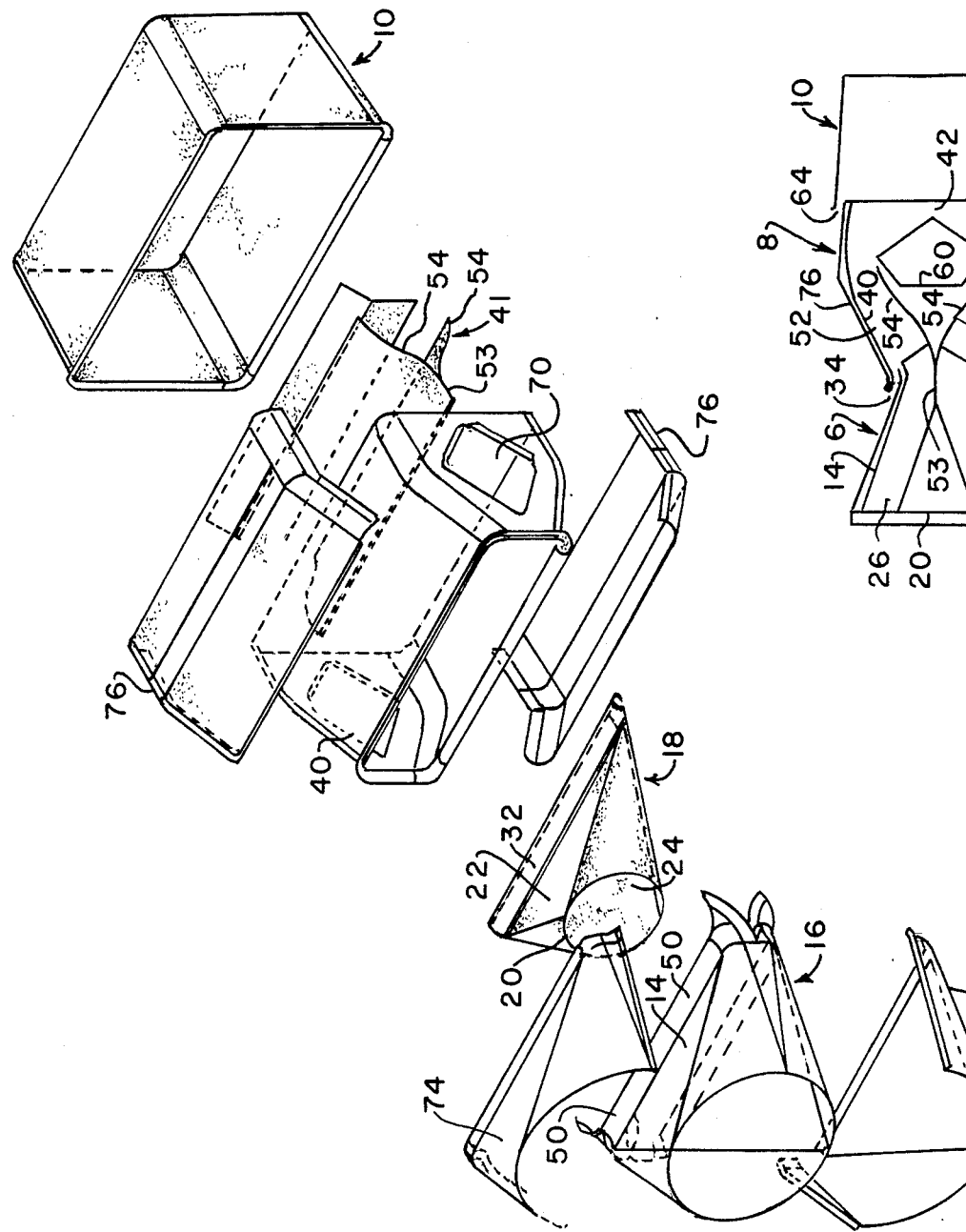
FIG. 3 is an exploded view of the suppressor.

Referring first to FIG. 1, military aircraft powered by gas turbine engines 2 usually require a suppressor 4 which will reduce or eliminate the infrared radiant energy which is emitted from visible hot portions of the engine, and hot exhaust gases. The suppressor 4 of this invention achieves the IR energy reduction by changing the normally circular cross sectional exhaust flow to a rectangular flow in a transition section 6, and by mixing these gases with external or ambient air in a mixer section 8. The suppressor of the invention incorporates a third section referred to as an extension section 10. Extension section 10 completes the line of sight blockage of uncooled hot metal surfaces in the mixer and transition sections.

Referring now to transition section 6, the upstream end of this section has a circular surface 12 (FIG. 2) provided with a flange, bracket or other means (not shown) for attachment to turbine engine 2. Downstream from the circular inlet surface 12 flat surfaces 14 are provided, inclined inwardly toward the centerline to a rectangular cross section. As can be seen in FIG. 3 this configuration forms a casing 16 with a circular inlet and a rectangular outlet.

Figure 4:
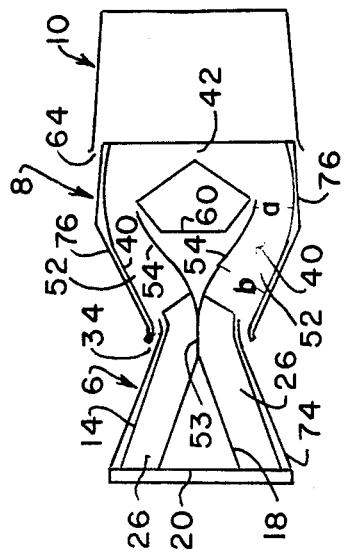
FIG. 4 is a diagrammatic representation of the invention.

The cross sectional flow through the transition section is controlled to eliminate sudden flow area changes which occur in prior art suppressors. This is accomplished by the inclusion within the outer casing 16 of an inner concentric flow separator 18 which fills the undesired cross sectional areas providing a geometrical match for controlling aerodynamic flow. Inner flow separator 18 matches outer casing 16, being similarly configured, with a circular upstream end 20 and converging flat walls 22 downstream therefrom in the direction of gas flow. Circular end 20 is a closed end, being provided with an end-plate 24, seen in FIG. 2, to form a gas inlet in duct 26 which is annular. The circular surfaces are flattened downstream and these converging flat walls 14 and 22 convert gas duct 26 to converging gas ducts in transition section 6 as shown in FIG. 4. Converging flat walls 22 merge to form a partition 32 which divides the converging ducts into two rectangular ducts.

It can be seen that the transition section 6 changes the normally circular gas flow cross section to a rectangular shape. Using the configuration shown this can be accomplished in a distance as short as ten inches in suppressors for utility and observation helicopter turbine engines. Flow area transition can be achieved in such short distances because of the geometrical symmetry which exists between the outer casing 16 and inner flow separator 18. Flow separator 18 fills the undesired cross sectional area within the transition section. The geometrical symmetry makes it possible to achieve the desired aerodynamic flow area with minimal aerodynamic losses.

The transition section is mated to a mixer section, that is, a mixer section 8 is integral with the exit of transition section 6. Mixer section 8 receives the exhaust gases which pass through the transition section 6. As shown in FIGS. 2 and 4 mixer section 8 has a rectangular inlet larger than the transition section outlet. It is positioned over the transition section 6 exit so as to overlap the outlet. The mixer section rectangular inlet is thus enlarged to form a perimetrical ambient air slot 34 between sections 6 and 8. Slot 34 is sized for the quantity of secondary air to be drawn in by ejector action established by the area and positioning relationships of the transition section exit, at partition 32, to the mixer section inlet. This relationship of the two areas establishes a mixing plane. Important in connection with this aspiration is lip 50. The upward curvature of this lip causes the ambient air drawn in thru slot 34 to flow along walls 40 to maximize the cooling thereof. If lip 50 is formed with a radius of at least 1.5 inches, back pressuring effects on the turbine engine are minimized. If the radius is smaller vortices are generated which cause the exhaust gases to heat walls 40.

The walls 40 of the mixer section 8 are inclined away from the centerline as will be apparent from the drawings forming a housing with an enlarged outlet 42. As will also be seen by reference to the drawings, corresponding to the two convergent transition section exhaust ducts 26, and as continuations thereof are two divergent exhaust ducts 52 emanating from partition 32 and a plane surface 53 to be described, in the mixing section (FIG. 4). The ducts are formed by a flow divider 41 disposed within the mixer section with walls 54 which emanate from plane surface 53 and then diverge as shown in FIG. 3.

Whereas mixer section walls 40 and flow divider walls 54 are somewhat parallel it has been found that cyclical flow and turbulence are minimized if the downstream surfaces of flow divider walls 54 are closer to mixer walls 40 (a of FIG. 4) than they are at the mixer section inlet (b of FIG. 4).

From FIGS. 2 and 4 it will be discerned that mixer section walls 40 are cool whereas diverging walls 54 are hot. Means to prevent viewing of not surfaces 54 must accordingly be a part of the suppressor. To hide hot surfaces 54 from view, therefore, a shielding plate 60 is provided. This plate is almost trapezoidal, the longer side being omitted, and it is disposed across the mixer section flow divider 41. In other words shielding plate 60 is positioned between flow divider walls 54 so that they are not visible from the rear. Since the shielding plate, as well as the under sides of the walls of flow divider 41, are cooled with external air as will be described later, shielding plate 60 is not in contact with divergent walls 54. An air space 62 (FIG. 2) is provided therebetween.

At this juncture it will be appreciated that a mix of ambient air and engine exhaust gases leaves the mixer section. In order to further cool this gas mixture, and more important, to prevent peripheral viewing of the ducts and internal engine surfaces, an extension section 10 is attached to the aft end of the suppressor mixer section 8. The extension section is in the form of a box-like or rectangular duct of sufficient length to supplement the line of sight blockage afforded by shielding plate 60. As mixer section 8 overlaps transition section 6 to form a secondary air inlet 34, so does extension section 10 overlap mixer section 8. This results in the formation of a rectangular air inlet slot 64. The air flowing in slot 64 forms a cooling air film across the surfaces of the extension section 10. Flow through this box-like section is otherwise unobstructed.

Referring now to the operation of the IR suppressor of the invention the hot exhaust gases from engine 2 flow into a transition section 6 constructed simply from any high temperature sheet stock material and consisting of an inner section concentric with the outer section. In the transition section the normally circular cross sectional exhaust gas flow path is changed to a rectangular flow path. This transition from a circular flow to a rectangular flow is achieved in a very short distance. The inner transition section allows the cross sectional flow area through the transition section to be controlled, and therefore eliminates sudden flow area changes which occur in some suppressors. The design of the inner and outer elements of the transition section results in complete control over the back pressuring effects on the engine's output shaft horsepower. The short transition section allows the designer to transition the suppressor's cross sectional flow area with complete control of area increases or decreases.

The mixer section 8 receives the exhaust gases that pass through transition section 6 and this section is provided with a cooling air slot 34 around/between the transition section exit and mixer section inlet. This slot 34 is sized for the quantity air to be pumped in by ejector action established by the relationship of the transition section exit edge and the mixer section inlet. The air drawn through this slot can be channeled from, and therefore through, an engine compartment for compartment cooling and/or channeled through a space on the backsides of the mixer section's interior walls for additional cooling of the interior surfaces that are visible through the exit plane of the suppressor exit. The air drawn through slot 34 also readily forms a cool film over the visible interior surfaces of the mixer section, therefore, provides a low surface temperature. Flow divider 41 diverts the flow away from the centerline and toward the longer outer walls. View of the flow divider 41 is blocked by shielding plate 60. They are thus positioned, and shaped, to prevent viewing of any hot surfaces thru the exhaust system exit.

The third section of the suppressor, extension section 10 is provided with a second cooling air slot 64 around and between the downstream end of the mixer section and the extension section inlet. The air drawn in this slot forms a cooling air film over the interior surface of this section to minimize heating of the surface by the cooler exhaust gases and thereby maintains lower surface temperatures that are visible through the exit. This section of the suppressor design is required to complete the line-of-sight (LOS) blockage of the hot metal in and forward of the chute and transition section exit. The longitudinal length and distance between the longer sides of the rectangular extension section exit is determined by the overall length of the suppressor desired and the required flow area for minimum aerodynamic losses. The line-of-sight blockage is achieved by positioning the hot chute's downstream edge or highest point to be on or above a line drawn between the transition section long exit edge and the long exit edge of the extension section.

In addition to preventing direct viewing of the hot turbine section and presenting only visible cooled surfaces with a minimum of shaft horsepower reduction, the problems of larger undesired flow and complex shapes and intricate designs are overcome by this invention. Moreover variations and modifications can be made without departing from the invention. As an example it is desirable to further cool flow divider 41 and shielding plate 60. This is accomplished by the provision of ambient air portholes 70 in each side of mixer section 8. When such portholes 70 are employed air space or slot 62 is even more important. It permits outside air not only to cool the flow divider and shielding plate but to flow into the extension section 10. The cooling air mixes with the exhaust gases at and downstream from the downstream divider edge to reduce the exhaust gas temperature.

In another embodiment of the invention additional cooling of external suppressor surfaces in the transition and mixer sections can be achieved by exterior baffles or walls. Entrainment of cooling air over transition section external walls 14 can be accomplished by outer transition section baffles 74 provided for simple film cooling thereof. Similarly if desired exterior mixer section baffle 76 provides cooling air for exterior mixer section walls 40.

As still an additional modification, it is possible to make flow divider 41 and shielding plate 60 removable when suppression of the IR signature is unnecessary. This will minimize horsepower reductions, and permit the remaining suppressor structure to function as a standard exhaust system. The flow divider and shielding plate can be made removable by the use of simple mechanical fasteners at each end, at portholes 70. The flow divider and shielding plate can be fabricated as two independent units, or structurally as one unit. In either case they will be withdrawn through either of the two portholes 70.

The suppressor design is rectangular with large corner radii from the exit of the transition section to the exit of the extension section. The rectangular shape can vary to allow the designer the flexibility for fitting the suppressor design into any aircraft space and utilize the benefits of reduced IR signatures due to suppressor exit eccentricity, as well as achieving any desired aerodynamic flow condition. The suppressor design also allows complete freedom to a designer in achieving prescribed infrared radiation suppression levels. The cross sectional flow area can be easily and simply controlled to achieve minimum aerodynamic losses and maximum suppression effects for minimum suppressor weight as compared to the concentric plug suppressor design. Moreover the suppressor design achieves compactness, light weight, simple construction with the short annular to rectangular transition section as compared to prior art IR suppressors. Such modifications in design are deemed to be within the scope of this invention.

What is claimed is:

1. In an infrared radiation suppressor for aircraft gas turbine engine outlets wherein hot exhaust gases discharged therefrom are blocked from view by metal surfaces, and mixed with ambient air drawn into said suppressor to cool the gases and radiation-emitting hot metal surfaces, the improvement comprising:

exhaust gas transition means including
        a gas inlet duct having a circular inlet adapted to fit the engine outlet, and having flat converging surfaces forming a rectangular outlet,
        a concentric flow separator geometrically similar to the gas inlet duct so that it has a round end, and two flat converging surfaces, but dissimilar in that a plate covers its round end,
        the flow separator being disposed within the gas inlet duct with its plate end in the circular gas inlet end, forming an annular duct for inflowing engine exhaust gases, and rectangular ducts downstream therefrom in the direction of gas flow,
    partition means formed by merging the two flat converging surfaces of the flow separator into a single dividing plane to form two adjacent rectangular outlet ducts, the transition duct thus transforming engine exhaust gases from annular flow to two rectangularly confined gas streams;
    air mixing means including a rectangular mixing duct larger than the rectangular transition duct outlet adapted to be attached thereto but to overlap the rectangular outlet or the transition duct to form a perimetrical ambient air inlet slot therebetween, the mixing duct having divergent walls and parallel sides forming a housing with
an outlet larger than its inlet,
flow divider means within the mixing duct having a plane surface joining the transition outlet partition means and having diverging walls in the housing as extensions of the plane surface,
the diverging walls extending across the housing between its sides to form two diverging gas ducts ducts separated from each other within the separated from each other within the housing, to effect more even heating of divider surfaces,
the cross sectional area of the housing being larger than that of the transition section outlet to create a mixing plane aspirating air through the perimetrical air inlet slot to cool gas stream in the two ducts,
a shielding plate within the housing between the diverging flow divider walls to block a rear view of the divergent flow divider, and spaced from the flow divider surfaces;
means cooling the flow divider and shielding plate including portholes in the sides of the mixer housing and slots between the shielding plate and flow divider which cooperate to draw ambient air across shielding plate and flow divider surfaces.

* * * * *